Sept. 9, 1958 J. BERNADYN 2,851,640
THREE PHASE A. C. PROTECTION RELAY
Filed Oct. 27, 1954

INVENTOR.
JOHN BERNADYN
BY Oscar B Brumback
ATTORNEY

United States Patent Office 2,851,640
Patented Sept. 9, 1958

2,851,640
THREE PHASE A. C. PROTECTION RELAY

John Bernadyn, Wyckoff, N. J., assignor to Bendix Aviation Corporation, Teterboro, N. J., a corporation of Delaware Application October 27, 1954, Serial No. 465,083
3 Claims. (Cl. 317—9)

This invention relates generally to the production of electrical control systems and more particularly to a protection device for an automatic pilot for aircraft.

Possible malfunctions or failures may occur in any circuit as complex and complicated as the electrical circuit of most automatic control systems, particularly automatic pilot systems, despite extreme care being exercised in the design, testing, and maintenance of the system. The monitoring devices for these circuits have heretofore monitored the voltage of the system and have employed complex equipment, such as torque motors, which operated contacts and alarms upon the loss of one voltage phase or upon a change in the relative voltage of the different phases of the power supply. Thus, when the voltage of the system showed an abnormality, for example, being too high or low or an entire phase being missing, the autopilot system was rendered ineffective.

However, the power supply for most control systems is designed to be larger than necessary to meet the normal operating conditions of the system; and this presents a disadvantage with voltage monitoring, because an abnormal condition, such as a short circuit, may greatly increase the load on the power supply without appreciably decreasing the voltage. The total power or current supplied at this time may be so great as to destroy components of the system without a voltage monitor recognizing the malfunctioning and protecting the equipment.

An object of the present invention, therefore, is to provide a novel protection system responsive to the power supplied to the control system.

Another object is to provide a novel protection system responsive to a change in current supplied to an electrical circuit.

A further object of the invention is to provide a novel system for monitoring both the alternating current and the direct current excitation to an automatic control system.

A still further object is to provide a novel monitoring system responsive to the flux induced by current flowing to the automatic control system.

The present invention contemplates a novel relay arrangement that will prevent the switch which supplies direct current excitation to the various relays and clutches contained in an automatic pilot system from remaining in an "on" position if no alternating current is supplied to the system, if no B+ voltage is available to the amplifier circuits, or if the power used in the system is not balanced; this power being determined by the flux induced in a balanced relay coil by the alternating current supply. The contemplated monitoring arrangement employs a relay arrangement responsive to the direct current supply for the amplifier tubes, responsive to the alternating current supply, and responsive to the flux balance of the alternating current supply.

The foregoing and other objects and advantages of the invention will appear more fully hereinafter from a consideration of the detailed description which follows, taken together with the accompanying drawing wherein two embodiments of the invention are illustrated by way of example. It is to be expressly understood, however, that the drawings are for the purpose of illustration and description only, and are not intended as a definition of the limits of the invention.

In the single sheet of drawing.

Figure 1:
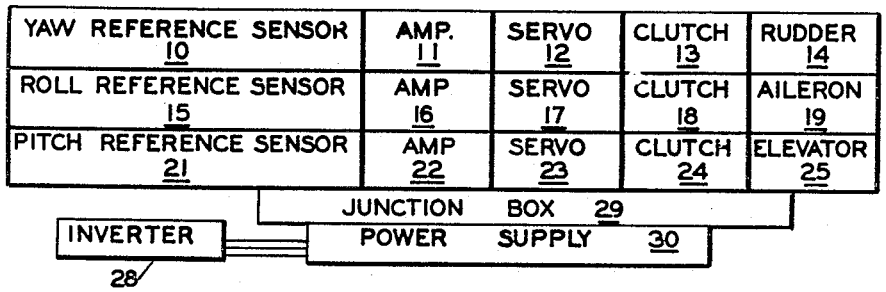
Figure 1 illustrates schematically a conventional automatic pilot system for an aircraft.
Figure 2:
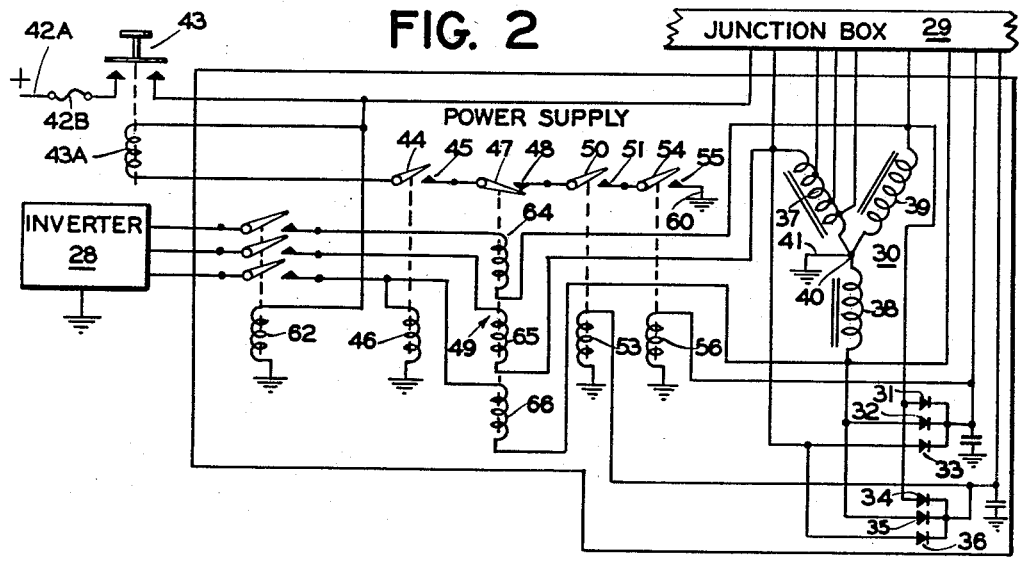
Figure 2 illustrates schematically the novel monitoring arrangement of the present invention as being incorporated in the power supply for an automatic pilot system.

The novel monitoring arrangement of the present invention is designed to operate with a conventional automatic pilot system, such as illustrated in block diagram form, one such automatic pilot system being shown in U. S. Patent No. 2,625,348 granted to Noxon et al. on January 13, 1953.

An automatic pilot system, as illustrated in the foregoing patent, controls the craft about its yaw, roll, and pitch axes. The yaw control channel comprises a series of reference devices 10, an amplifier 11, a servo motor 12, a clutch 13 and a rudder 14; the roll control channel comprises a series of reference devices 15, an amplifier 16, a servo motor 17, a clutch 18, and an aileron surface 19; the pitch control channel comprises a series of reference devices 21, an amplifier 22, a servo motor 23, a clutch 24 and elevator surfaces 25. Alternating current is supplied by a conventional inverter 28 to a junction box 29 through an autotransformer 30.

Autotransformer 30 supplies direct current to the amplifier tubes by way of rectifiers 31, 32, and 33 and rectifiers 34, 35, and 36 and supplies alternating current to the servos, the amplifiers, and the servomotors by way of taps leading to junction box 29; each servomotor 12, 17 and 23 operating from a different phase of the three phase alternating current supply.

This autotransformer may be conventional, having three windings 37, 38 and 39 which are joined at terminal 40 and grounded by lead 41. Inverter 28 supplies alternating current to the autotransformer, one phase of the inverter being connected to each winding of the transformer. As is well known, the primary winding of the transformer is also part of the secondary winding and the two windings are conductively connected together so that part of the energy in the secondary comes directly from the primary. The voltage output is determined by the point by which the winding is tapped relative to ground 41. For purposes of simplicity only winding 37 is shown as being tapped. The three windings are balanced during normal operation.

In accordance with the present invention, a power protection monitor responds to the presence or absence of alternating current for the automatic pilot system, to the direct current, and to a power fault in the system. The novel monitoring arrangement, however, does not respond to the small overloads normally expected in complex systems but does prevent damage to major components of the system when the nature of the fault either produces short circuit currents or sufficient line currents to cause a recognized unbalance in the system.

Turning now to the novel monitoring arrangement, lead 42A conducts direct current to the clutches and various relays of the system via a safety fuse 42B and a solenoid held switch 43. This switch may be generally similar to the switch described in copending application Serial No. 333,711 assigned to the same assignee as the present invention. Depressing switch 43 closes the circuit supplying the direct current to the system, engaging the clutches to render the servomotors effective on the surfaces and energizing a solenoid 43A by way of a holding circuit completed through contacts 44, 45 of the alternating voltage detector relay 46, through contacts 47, 48 of the line unbalance detector relay 49, through contacts 50 and 51 of a direct current responsive relay 53, and through contacts 54, 55 of a second direct curent responsive relay 56. If relays 62, 46, 53 and 56 detect a voltage in the system, the foreign contacts will be engaged to provide a continuous circuit from line 29 through solenoid 43A to ground 60.

Line unbalance detector relay 49 will be in the inoperative state for two conditions: the absence of any alternating current from inverter 28, and a balanced condition of the automatic pilot system. Relay 46, therefore, is connected to respond to the presence or absence of alternating voltage in the system, the connection being from one phase of the alternating current supply to ground. When alternating current is present solenoid 46 is energized and contacts 44 and 45 are engaged; when alternating current is absent, relay 46 is deenergized, contacts 44, 45 are disengaged, opening the circuit through solenoids 43A so that switch 43 will not stay "on."

The B+ supply responsive relays 53 and 56 monitor the direct current power supplies to the various tubes in the system. When the B+ voltage supply is absent or so shorted as to reduce the normal voltage to a predetermined level, the solenoids of relays 53 and 56 are not energized sufficiently to hold contacts 50, 51 and contacts 54, 55 engaged. This also breaks the continuous circuit through solenoid 43A to ground and switch 43 will not stay "on."

The presence or absence of direct current for the clutches and other relays is monitored by relays 43A and 62. If the direct current is not available, neither of these relays will be energized. Short circuits and overload conditions in line 42A are recognized by the failure of fuse 42B.

The alternating current supply system is designed to be balanced, and an unbalance in the currents supplied to autotransformer 30 is recognized by relay 49. Relay 49 contains three windings 64, 65 and 66; each winding being energized by one phase of the alternating current supplied to autotransformer 30 by inverter 28. The fluxes resulting from the current flowing through coils 64, 65 and 66 balance, the vectors of the fluxes being one hundred twenty electrical degrees apart in direction and of equal magnitude. Consequently, should a failure of the current supply to one winding or a greater than usual current supply to one winding exist, the flux is unbalanced and the resultant energizes relay 49. This opens contacts 47 and 48, breaking the circuit through solenoid 43A to ground 60. Upon the deenergizing of solenoid 43 due to any of the above conditions, switch 43 moves to an "off" position. This opens lead 42A, deenergizing solenoid 62 and stopping the alternating current flow from inverter 34 to autotransformer 30.

Figure 3:
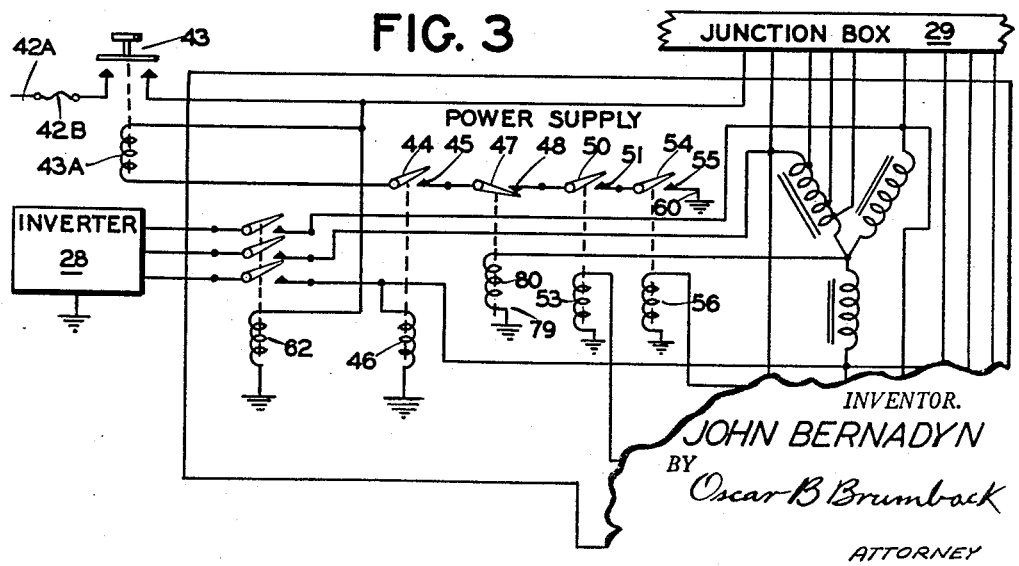
Figure 3 is another embodiment of the novel monitoring system shown in Figure 2.

The system so far described operates well with capacitative, inductive and resistive loads. When the loads are primarily of a resistive nature, a power fault will cause the current to increase and the monitor system shown in Fig. 3 may be used. In Figure 3 the relay 49 is replaced with a relay 79 having a single solenoid 80 connected in lead 41 between the terminal 40 and the ground. The three phase windings 31, 32 and 33 of transformer 30 are normally balanced. Therefore, no current normally flows in lead 41; but upon an unbalance of current to one winding, 36, 33, or 38, a current flows through lead 41. This current flowing through coil 80 of relay 79 energizes the relay, disengaging armatures 47 and 48 and opening the circuit through solenoid 43A to ground 60. This returns button 43 to an "off" position.

The foregoing has presented a novel monitoring arrangement for recognizing the presence or absence of alternating current to the control system, an unbalance in the alternating current supplied to the system, the presence and absence of direct current to the tubes of the amplifiers of the system, and the presence or absence of direct current to the various clutches of the system. In the event of failure of any of these sources, the automatic pilot system is turned "off" before any appreciable damage can occur to the components of the system or to the aircraft as a result of the operation of the system.

I claim:

1. In an automatic pilot system for a craft, first means for rendering said automatic pilot system effective and ineffective on said craft, second means adapted to be connected with said first means and operable in a first and a second manner for causing said first means to render said automatic pilot selectively effective and ineffective on said craft, said automatic pilot system including a plurality of amplifiers and servomotors, a three-phase power source and an autotransformer for supplying alternating and direct current excitation for said servomotors and amplifiers, and safety means adapted to operably connect said power source and said autotransformer including normally balanced means responsive to the current from said source to said transformer and operable upon an unbalance of said current for operating said second means from a first to a second manner, and said safety means including means responsive to the absence of direct current excitation to said amplifiers for operating said second means in said second manner.

2. In an automatic pilot system for an aircraft, a polyphase power source, a polyphase autotransformer, a momentarily engageable push button, means normally operable upon the momentary engagement of said push button for connecting said power source to said autotransformer for supplying power thereto whereby said autotransformer supplies direct and alternating current excitation to said automatic pilot system, means operable in response to an unbalanced current flow to said autotransformer for actuating said first named means to disconnect said power source from said autotransformer, and additional means responsive to said direct current from said autotransformer for actuating said first named means to disconnect said power source from said autotransformer upon failure of said direct current, whereby said craft is protected from operation of said automatic pilot system upon unbalance in the alternating current excitation supplied and the loss of the direct current to said automatic pilot system.

3. In an automatic pilot system for an aircraft, a polyphase power source, a polyphase autotransformer, a momentarily engageable push button, means normally operable upon the momentary engagement of said push button for connecting said power source to said autotransformer for supplying power thereto whereby said autotransformer supplies direct and alternating current excitation to said automatic pilot system, means operable in response to an unbalanced current flow to said autotransformer for actuating said first named means to disconnect said power source from said autotransformer, means responsive to said direct current from said autotransformer for actuating said first named means to disconnect said power source from said autotransformer upon failure of said direct current, a direct current source for clutches and relays of the automatic pilot system, means for connecting the direct current source with the automatic pilot system, and means responsive to the output of said autotransformer for disconnecting the direct current source from the automatic pilot.

References Cited in the file of this patent

UNITED STATES PATENTS

| | | |
|---|---|---|
| 1,705,687 | Sleeper | Mar. 19, 1929 |
| 2,020,972 | Starr | Nov. 12, 1935 |
| 2,242,950 | Harder | May 20, 1941 |
| 2,247,062 | Lorraine | June 24, 1941 |
| 2,426,071 | Veinott | Aug. 19, 1947 |
| 2,625,348 | Noxon et al. | Jan. 13, 1953 |
| 2,691,122 | Moog | Oct. 5, 1954 |
| 2,697,195 | Courtney | Dec. 14, 1954 |
| 2,733,399 | Derr et al. | Jan. 31, 1956 |

OTHER REFERENCES

Electrical World, March 23, 1945, pp. 423 and 424.